Feb. 19, 1957   W. W. HOFFMANN   2,781,976
PREDETERMINING COUNTER
Filed Sept. 11, 1953   2 Sheets-Sheet 1
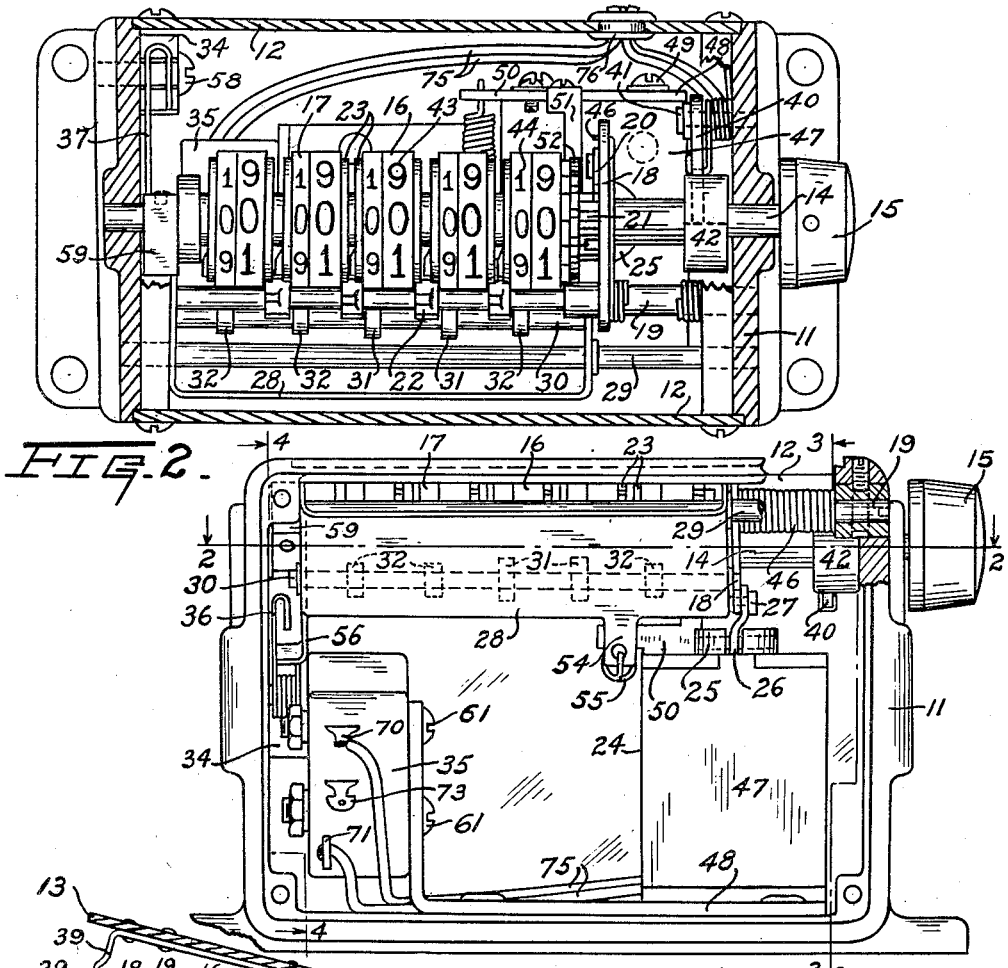
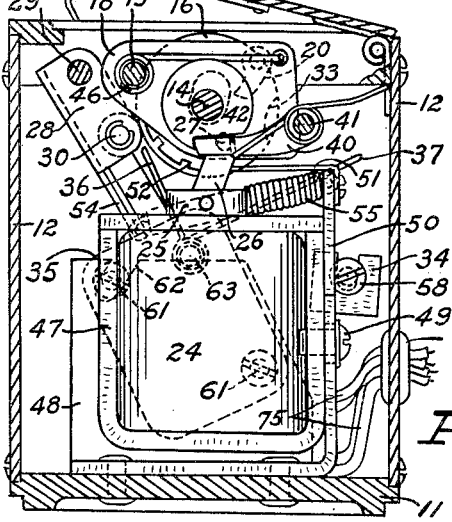
INVENTOR.
W. W. Hoffmann
BY
Lieber & Lieber
ATTORNEYS.

Feb. 19, 1957 W. W. HOFFMANN 2,781,976
PREDETERMINING COUNTER
Filed Sept. 11, 1953 2 Sheets-Sheet 2
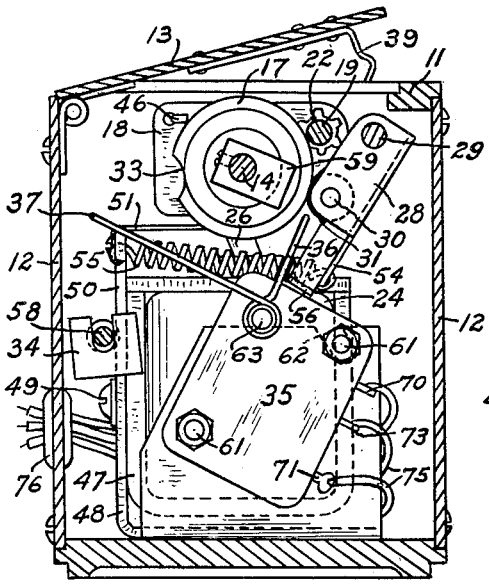
FIG. 4.
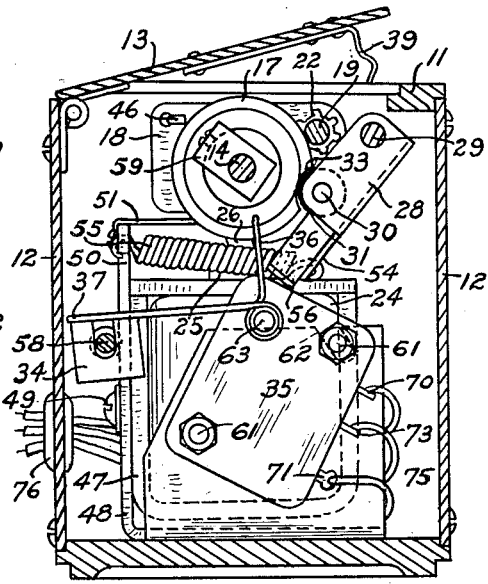
FIG. 5.
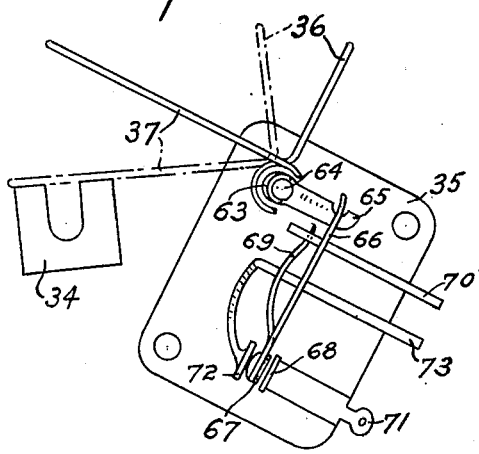
FIG. 6.
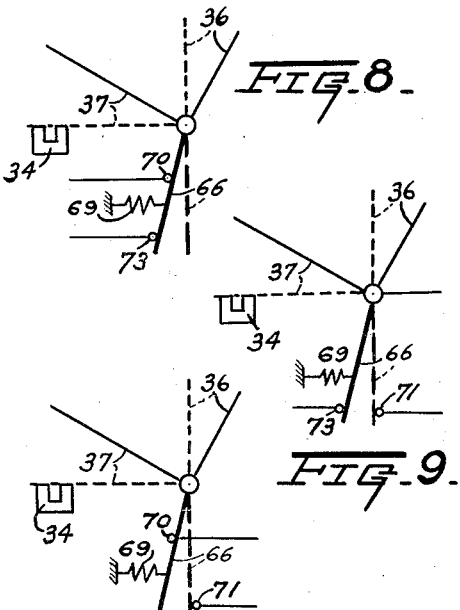
FIG. 8.
FIG. 9.
FIG. 7.
INVENTOR.
W. W. Hoffmann
BY
Lieber & Lieber
ATTORNEYS.

United States Patent Office 2,781,976
Patented Feb. 19, 1957

2,781,976
PREDETERMINING COUNTER

Walter W. Hoffmann, Waukesha County Wis., assignor to Durant Manufacturing Co., Milwaukee, Wis., a corporation of Wisconsin Application September 11, 1953, Serial No. 379,612

4 Claims. (Cl. 235—132)

My present invention relates generally to improvements in mechanism for automatically counting and for indicating the occurrence of a predetermined number of events, and relates more specifically to improvements in the construction and operation of predetermining counters of the general type shown and described in my Patent No. 2,673,686, granted March 30, 1954.

It has heretofore been common practice to provide various kinds of machines with so-called predetermining counters adapted to be pre-set so as to automatically actuate a signal or stop production by the associated machines, when a predetermined number of operations have been performed or completed, and wherein the counter could be reset after completion of each preselected count. This type of predetermining counter is usually provided with an electric switch adapted to control the signal or the functioning of the production machine, whenever a predetermined count has been attained, and when this control switch is thrown it is ordinarily desirable to positively maintain it in operated condition until the counter wheels have been substantially reset.

In my prior patent above identified, I have provided a permanent magnet adjustably secured to the reset shaft of the counter for maintaining the movable contact of such a control switch in position after it has been thrown by the count predetermining mechanism, until the reset shaft has been manipulated to approximately reset all of the numeral wheels of the counter. While this construction operates quite satisfactorily, it is difficult to adjust the magnet relative to its carrying shaft so that it will cooperate with the movable switch contact with utmost precision, and it is also difficult to effect rapid and accurate setting of the predetermining wheels relative to the numeral wheels especially in small counters. Then too, this prior structure did not make adequate provision for positively preventing rotation of the reset shaft in reverse direction, and for avoiding excessive drag on the rotating predetermining wheels which tends to retard proper functioning of the very sensitive control switches preferably utilized in these counters.

It is therefore a primary object of the present invention to provide various improvements in the construction and operation of predetermining counters cooperating with such electrical control switches, whereby most efficient functioning thereof is assured at all times.

Another important object of the invention is to provide a predetermining counter of the type wherein an electric control switch is adapted to be actuated by the predetermining mechanism and is positively held in actuated condition until the numeral wheels of the counter have been practically reset to zero reading.

A further important object of this invention is to provide improved predetermining mechanism for counters of the type having several numeral wheels of progressively higher order each provided with a predetermining wheel having a cam ring cooperable with a switch actuating roller, wherein objectionable drag between the rings and rollers is eliminated and more sensitive actuation of such counter is assured.

Still another important object of my invention is to provide improved mechanism for resetting a predetermining switch actuating counter with the aid of a common rotary reset shaft provided with means for positively preventing rotation thereof in reverse direction.

An additional object of the invention is to provide an improved predetermining counter of simple and compact construction, all parts of which may be conveniently adjusted so as to insure operation of the counting unit with utmost precision.

These and other more specific objects and advantages of the present invention will be apparent from the following detailed description.

A clear conception of the several features constituting the present improvement, and of the construction and operation of a commercial predetermining counter embodying the invention, may be had by referring to the drawings accompanying and forming a part of this specification in which like reference characters designate either the same or similar parts in the various views.

Fig. 1 is a front elevation of a predetermining counter having five sets of numeral and predetermining wheels of progressively higher order adapted to be manually reset whenever a predetermined count has been attained;

Fig. 2 is a longitudinal horizontal section through the counter of Fig. 1, taken along the straight line 2—2 and showing both the numeral and predetermining wheels set to zero reading;

Fig. 3 is a transverse vertical section through the same counter, taken along the irregular line 3—3 and looking toward the driving end of the counting mechanism;

Fig. 4 is also a transverse vertical section through the counter of Fig. 1, taken along the irregular line 4—4 and looking toward the opposite end of the mechanism, the parts being shown in normal counting position with the electrical control switch open;

Fig. 5 is a similar transverse vertical section through the counter also taken along the irregular line 4—4 of Fig. 1, but showing the parts just prior to reaching zero reading position of the several numeral wheels and with the control switch closed;

Fig. 6 is an enlarged diagrammatic view of the microswitch mechanism embodied in the particular counter shown;

Fig. 7 is a diagram showing the positions of the electrical switch contacts of Figs. 4, 5 and 6 when the counter is operating, and after it has attained the predetermined count;

Fig. 8 is a similar diagram but showing the positions of the switch contacts in a modified arrangement; and Fig. 9 is another similar diagram, showing the positions of the control switch contacts in still another modified arrangement.

While the invention has been illustrated and described herein as having been embodied in an electrically driven predetermining counter having five sets of predetermining and numeral wheels rotatable about a common axis or reset shaft, it is not may desire or intention to unnecessarily restrict the use of the improved features to such a mechanism; and it is also contemplated that specific descriptive terms used herein be given the broadest possible interpretation consistent with the disclosure.

Referring to the drawings, the typical improved predetermining counter shown therein, comprises in general, a main casing 11 having opposite removable side walls 12 and a top cover 13 provided with the usual sight opening; a normally stationary reset shaft 14 mounted in and spanning the upper interior of the casing 11 and having an actuating knob 15 secured to an outer end thereof;

five sets of counting wheels of progressively higher order each consisting of a numeral wheel 16 and a cooperating predetermining wheel 17, and all being rotatably supported upon the reset shaft 14; an oscillatory plate 18 swingably suspended from a fixed pivot shaft 19 also spanning the upper interior of the casing 11 laterally of the reset shaft 14 and having thereon a pawl 20 cooperable with a ratchet wheel 21 drivingly cooperable with the numeral wheel 16 of lowest order; a series of transfer pinions 22 journalled upon the pivot shaft 19 and coacting with gearing 23 on the counter wheels 16, 17 to intermittently transmit rotary motion from the wheel sets of lower order to the adjacent sets of higher order; an electric solenoid 24 confined within the lower interior of the casing 11 and having a vertically reciprocable core 25 connected by a link 26 to a driving pin 27 secured to the oscillatory plate 18; an elongated yoke 28 swingably suspended from a second fixed pivot shaft 29 located laterally of the shaft 19 and also spanning the upper casing interior, the yoke 28 carrying a shaft 30 having thereon large and smaller rollers 31, 32 respectively cooperable with local peripheral notches 33 formed in the adjacent predetermining wheels 17, whenever a predetermined count is being attained; a permanent magnet 34 adjustably attached to the interior of an end wall of the casing 11; and an electrical control switch 35 also confined within the casing 11 and having an L-shaped contact actuating arm of magnetic material provided with branches 36, 37 of which the branch 37 is cooperable with the magnet 34 whenever all of the rollers 31, 32 enter all of the notches 33 of the predetermining wheels 17.

The main casing 11 has an integral supporting base and the side closure walls 12 are detachably secured to the casing 11 by screws while the cover 13 which is hingedly secured to one side wall 12 is provided with a spring clip 39 adapted to hold the cover plate in closed position. The normally stationary reset shaft 14 is journalled in integral opposite end walls of the casing 11 and is rotatable by the knob 15 in only a counter clockwise direction as viewed in Fig. 3, being positively prevented from rotating in the opposite direction by a spring pressed latch pawl 40 mounted upon a pivot pin 41 and coacting with a notched disk 42 fastened to the shaft 14. The counting wheels are of well known construction and both the numeral wheels 16 and the predetermining wheels 17 are provided with peripheral numbers 43, 44 respectively, the wheels 16, 17 of each set normally being simultaneously rotatable about the reset shaft 14 during counting operation, but the predetermining wheels 17 being rotatably adjustable relative to their respective numeral wheels to effect predetermined setting of the counter. Such adjustment may be readily accomplished by merely swinging the cover 13 open and without removing the side walls 12, and the readings of the alined numbers 43, 44 are visible through the sight opening in the cover 13 when closed.

The electric counter driving mechanism is also of relatively well known construction and operation and as shown in my prior Patent No. 2,673,686 hereinabove referred to, and the solenoid core 25 is normally lifted to swing the actuating plate 18 upwardly about its pivot shaft when the solenoid 24 is energized, and is quickly lowered by gravity and by the action of a torsion spring 46 whenever the solenoid coil is deenergized. The solenoid coil is mounted in a sturdy frame 47 adjustably secured to a bracket 48 by means of screws 49, and the bracket 48 is firmly attached to the base of the casing 11 and has an upstanding projection 50 thereon which carries a spring pawl 51 coacting with a notched disk 52 secured to the numeral wheel of lowest order so as to prevent reverse rotation thereof. The transfer pinions 22 and the gearing 23 with which they cooperate to intermittently transmit rotary motion from the counter wheels of lower order to the adjacent wheels of higher order during normal functioning of the counter, are also of old and well known construction and operation.

The elongated swingable yoke 28 which is pivotally suspended from the shaft 29 and carries the rollers 31, 32 which are cooperable with the peripheries of the adjacent predetermining wheels 17 and with the local notches 33 therein, has a medial integral downwardly extending projection 54 the lower end of which it attached to one end of a helical tension spring 55, and is also provided with an integral depending L-shaped end projection 56. The opposite end of the helical spring 55 is attached to the upstanding bracket projection 50, thus tending to constantly swing the yoke 28 and the rollers 31, 32 toward the counter wheels 16, 17. As previously indicated, the rollers 31 are of larger diameter than the rollers 32, and this construction is important since it eliminates undesirable drag on the predetermining wheels 17 as the predetermined count is being approached. The L-shaped end projection 56 of the yoke 28 is adapted to engage the branch 36 of the switch actuating arm when the rollers 31, 32 enter the predetermining wheel notches 33, and to thereby actuate the switch 35 while causing the magnet 34 to engage and positively hold the other branch 17 of the L-shaped switch actuating lever, see Fig. 5.

The permanent magnet 34 is formed of "Alnico" metal or the like adapted to be intensely and lastingly magnetized, and is adjustably secured to an integral end wall of the casing 11 by means of a screw 58 passing through a central bifurcation in the magnet. The position of this magnet 34 can therefore be accurately fixed upon removal of the adjacent casing side wall 12 with the aid of a screw driver, so that the magnet will most effectively cooperate with and hold the branch 37 of the switch actuating arm. In order to release the switch actuating arm from the magnet 34 when the counter is being reset, the end of the reset shaft 14 remote from the knob 15, is provided with an adjustable block 59 which is adapted to engage the upstanding branch 36 of the arm and to release the latter from the magnet just prior to final resetting of the counter wheels 16, 17 to starting position, and this block 59 may be angularly adjusted about the shaft 14 with the aid of a set screw so as to insure reverse actuation of the switch 35 at the proper moment, see Figs. 4 and 5.

The electrical control switch 35 shown herein is of the micro type adapted to either actuate a signal so as to inform an attendant whenever a predetermined count has been attained by the counting unit, or to operate a relay for controlling the operation of a production machine with which the counter is associated. The switch 35 is adjustably secured to another upstanding integral wall of the bracket 48 which also carries the solenoid 24, by means of bolts 61 at least one of which coacts with a slot 62 in the bracket, and is operable by a shaft 63 to which the branches 36, 37 of the actuating arm are firmly secured as by soldering, see Figs. 1, 3, 4 and 5. As illustrated in Fig. 6, the switch actuating shaft 63 is provided within the switch housing with an eccentric 64 or similar formation cooperable through a connecting rod 65 with the upper end of a resilient movable contact carrier arm 66 the lower end of which has a movable contact 67 secured thereto and cooperable with a fixed contact 68, and the medial portion of which is provided with an integral leaf spring 69. The entire carrier arm 66 is formed of electrically conductive metal and the upper end of the leaf spring 69 is fulcrumed upon a terminal 70 so that this spring will throw the movable contact 67 into engagement with the fixed contact with a snap action whenever the eccentric 64 is rotated in a counterclockwise direction, and will also open the switch with a snap action upon reverse rotation of the eccentric. The fixed contact 68 is mounted upon another terminal 71, as shown in Figs. 6 and 7, and an extra fixed contact 72 connected to a terminal 73 in order to obtain modified functioning of the switch 35 as in Figs. 8 and 9 may also be provided.

The terminals 70, 71, 73 may be connected to the controlled electrical equipment by means of conductors 75 which may be extended through a ferrule 76 carried by one side wall 12 of the casing, so that all of the relatively delicate parts of the counting unit may normally be most effectively housed and concealed within the casing 11. The predetermining wheels 17 are however readily accessible for adjustment by merely swinging the cover 13 open, and all of the other adjustable elements of the counter are freely accessible and readily adjustable upon removal of the casing side walls 12 in order to place the mechanism in proper condition for most efficient operation.

When the improved predetermining counter has been properly constructed, assembled and adjusted as above described, its normal use and operation is as follows. Assuming the switch 35 to be connected to a signal or a machine controlling relay so that the switch will be open while the counter is operating and will close when a predetermined count is attained, as in Figs. 6 and 7, the predetermining wheels 17 should first be adjusted relative to the adjacent numeral wheels 16 while the latter are at zero reading, to indicate the desired predetermined count. The counter may then be operated with the aid of the solenoid 24, core 25, oscillatory plate 18 and spring 46 to gradually approach the predetermined number, and during this counting operation the rollers 31, 32 will ride upon the cylindrical portions of the peripheries of the adjacent predetermining wheels and the switch actuating arm will remain in switch open position, as in Fig. 4. The reset shaft 14 with its block 59, disk 42 and knob 15 will be held fixed by the pawl 40 while the counting operation is progressing, but the wheels 16, 17 will be intermittently rotating about the shaft 14 and the pinions 22 will be likewise revolving about the fixed pivot shaft 19.

When the predetermined number of counts is reached, all of the peripheral notches of the predetermining wheels 17 will become alined, thereby permitting all of the rollers 31, 32 to be automatically forced into the adjacent notches by the helical tension spring 55 coacting with the yoke 28 and swinging the latter into the position shown in Fig. 5. As the yoke 28 swings toward the left as viewed in Fig. 5, the end projection 56 thereof engages the branch 36 of the switch actuating arm and simultaneously rotates the shaft 63 to close the switch 35 and swings the other branch 37 into proximity with the magnet 34. This magnet thereafter draws the arm branch 37 into intimate contact with the magnet poles and positively holds the switch 35 in closed position until otherwise released. The signal will then be operated or the production machine will be stopped until the operator or attendant resets the counter.

In order to reset the counter unit so as to repeat the predetermined count or to effect a new predetermined count, it is only necessary to manually rotate the reset shaft 14 with the aid of the knob 15. While the reset shaft 14 is being thus rotated in a clockwise direction as viewed in Fig. 3, the magnet 34 will continue to positively hold the switch 35 closed until just prior to the time when resetting has been completely effected. The block 59 secured to the reset shaft 14 will then engage the upstanding branch 36 of the switch actuating arm, and will simultaneously rotate the shaft 63 to open the switch and release the other arm 37 from the influence of the permanent magnet 34. The signal will then become inactive or the production machine may again be operated, while the subsequent counting operation of the unit is repeated.

While the switch assemblage shown in Figs. 6 and 7 functions to close the switch 35 whenever a predetermined count has been attained, and to open this switch when the counter is reset, this switch may be readily modified to produce different functioning thereof. As shown in Fig. 8, for example, the switch will normally be closed during operation of the counter, and will open whenever the predetermined count is reached. As depicted in Fig. 9, the switch may complete one electric circuit while the counter is operating normally, and may be caused to break that circuit and to complete another whenever the predetermined count is attained. The electrical control system is therefore highly flexible in its adaptations, and any other suitable type of control switch may be utilized.

It is to be noted that when resetting of the counter is being effected, the reset shaft 14 may be rotated in one direction only and cannot be reversed due to the action of the holding pawl 40 coacting with the disk 42 secured to this shaft. The use of several larger intermediate rollers 31 coacting with the cylindrical peripheries of the predetermining wheels 17 while the counter is operating normally, materially reduces the friction drag on the counter wheels, and the fact that the control switch 35 is not released and reversed until the resetting operation has been substantially completed is also of considerable importance and differs from most prior counters in which the control switch is reversed the moment resetting is started. By locating the magnet upon a side wall 12 of the casing 11 instead of upon the reset shaft 14, far more accurate adjustment of this magnet is possible; and the removable side walls 12 and cover 13 enable the mechanism to be freely inspected and adjusted with utmost precision.

From the foregoing detailed description it will be apparent that the present invention provides an improved predetermining counter effectively operable at high or low speeds, and all parts of which are readily adjustable to function with utmost precision. The improved unit is simple and compact but sturdy in construction, and all parts thereof are well concealed and protected during normal operation but are conveniently accessible for inspection. The counter is extremely flexible in its adaptations and can be produced at moderate cost in various sizes and for diverse uses, and has proven highly satisfactory in commercial use.

It should be understood that it is not desired to limit this invention to the exact details of construction and operation of the counting unit herein specifically illustrated and described, for various modifications within the scope of the appended claims may occur to persons skilled in the art.

I claim:

1. In a counter, a succession of numeral wheels of progressively higher order, a peripherally notched predetermining wheel rotatably adjustable relative to each of said numeral wheels, a normally stationary reset shaft about which said wheels are rotatable during counting operation, an electric switch having a contact movable in opposite directions, means for moving said switch contact in one direction whenever all of said predetermining wheel notches attain alined positions, a permanent magnet mounted independently of said shaft for holding said switch contact in fixed position when moved in said direction, and means carried by said shaft for releasing said switch contact from said magnet and for moving the contact in the opposite direction only when the shaft has been rotated sufficiently to substantially reset said numeral wheels.

2. In a counter, a succession of numeral wheels of progressively higher order, a peripherally notched predetermining wheel rotatably adjustable relative to each of said numeral wheels, a normally stationary reset shaft about which all of said wheels are rotatable during counting operation, an electric switch having a contact movable in opposite directions, a yoke having rollers cooperable with said predetermining wheels and being operable when all of said rollers engage all of said notches to move said switch contact in one direction, a permanent magnet mounted independently of said shaft and being cooperable with said switch contact to hold the latter in a definite position when moved in said direction, and means adjustably secured to said shaft for releasing said switch contact from said magnet and for moving the contact in the opposite direction when the shaft has been rotated sufficiently to approximately complete resetting of said numeral wheels to zero reading.

3. In a counter, a succession of numeral wheels of progressively higher order, a peripherally notched predetermining wheel rotatably adjustable relative to each of said numeral wheels, a normally stationary reset shaft about which all of said wheels are rotatable during counting operation, an electric switch having a contact movable in opposite directions, an oscillatory arm for actuating said movable switch contact, a yoke having rollers of different diameters cooperable with said notches to cause the yoke to move said switch contact in one direction whenever all of the rollers engage all of the notches, a bifurcated permanent maget having spaced poles for holding said switch contact actuating arm in fixed position when moved in said direction until said shaft is rotated to reset said numeral wheels, and means coacting with the bifurcation of said magnet for effecting adjustment of said poles for proper coaction with said arm.

4. In a counter, a casing, a succession of numeral wheels of progressively higher order mounted within said casing, a predetermining wheel rotatably adjustable relative to each of said numeral wheels, a normally stationary reset shaft about which said wheels are rotatable during counting operation, an electric switch having a contact movable in opposite directions, an oscillatory actuating arm for said contact pivoted on said casing, means for moving said switch contact actuating arm in one direction whenever all of said predetermining wheels attain a predetermined position, a permanent magnet mounted directly upon said casing and having spaced poles for holding said switch contact actuating arm in fixed position when moved in said direction, means for rotating said magnet to vary the position of said poles relative to said actuating arm, and means for releasing said switch contact from said magnet and for moving the contacts in the opposite direction when said shaft is rotated to reset said wheels.

References Cited in the file of this patent

UNITED STATES PATENTS

| | | |
|---|---|---|
| 2,110,857 | Garman et al. | Mar. 15, 1938 |
| 2,416,081 | Bakke | Feb. 18, 1947 |
| 2,538,243 | Hazard et al. | Jan. 16, 1951 |
| 2,581,859 | Hoye | Jan. 8, 1952 |
| 2,622,804 | Hamisch | Dec. 23, 1952 |
| 2,673,686 | Hoffmann | Mar. 30, 1954 |